United States Patent [19]
Kim

[11] Patent Number: 5,481,516
[45] Date of Patent: Jan. 2, 1996

[54] OPTICAL DISK PICKUP DEVICE INCLUDING WAVEGUIDE WITH SEPARATE INTEGRATED GRATING COUPLERS FOR LASER OUTPUT, FOCUS, AND TRACKING ERROR SIGNALS

[75] Inventor: Eun J. Kim, Seoul, Rep. of Korea

[73] Assignee: Goldstar Co., Ltd., Seoul, Rep. of Korea

[21] Appl. No.: 191,182

[22] Filed: Feb. 3, 1994

[30] Foreign Application Priority Data

Feb. 3, 1993 [KR] Rep. of Korea .................... 1993-1432

[51] Int. Cl.$^6$ ........................................................ G11B 7/00
[52] U.S. Cl. ........................................ 369/44.12; 369/112
[58] Field of Search .......................... 369/44.12, 44.23, 369/112, 109, 44.41, 44.42, 103; 385/14, 15, 27, 37

[56] References Cited

U.S. PATENT DOCUMENTS

| | | | |
|---|---|---|---|
| 4,779,259 | 10/1988 | Kono et al. | 369/44.12 |
| 4,929,044 | 5/1992 | Arimoto et al. | 359/15 |
| 5,081,615 | 1/1992 | Sunagawa | 369/44.12 |
| 5,119,355 | 6/1992 | Yamamoto et al. | 369/44.12 |
| 5,128,915 | 7/1992 | Yamashita et al. | 369/44.12 |
| 5,153,860 | 10/1992 | Sunagawa et al. | 369/112 X |
| 5,161,148 | 11/1992 | Hori et al. | 369/112 |
| 5,164,930 | 11/1992 | Sugiura | 369/44.12 |
| 5,317,551 | 5/1994 | Shiono | 369/44.12 |

FOREIGN PATENT DOCUMENTS

| | | | |
|---|---|---|---|
| 0263350 | 12/1989 | Japan | 369/44.12 |
| 0372749 | 12/1992 | Japan | 369/44.12 |

Primary Examiner—Aristotelis Psitos
Assistant Examiner—Thang V. Tran

[57] ABSTRACT

An optical pickup device for an optical disk includes a semiconductor laser, an optical waveguide for propagating the laser beam, at output grating coupler for focusing the propagated beam through the optical waveguide onto one point of a optical disk, an input grating coupler for coupling a beam reflected and diffracted from the optical disk into the optical waveguide and for dividing the beam to detect focus and tracking error signals, and photodiodes for detecting the beam coupled into the optical waveguide by the input grating coupler. The photodiodes include a 3-piece-divided photodiode for detecting readout signals and focus error signals, and a 2-piece-divided photodiode for detecting tracking error signals. The optical waveguide, output grating coupler, input grating coupler, and the photodiodes are integrated on the surface of a slab substrate, allowing the optical pickup to be miniaturized and made light, and thus allowing the access time to be faster.

3 Claims, 3 Drawing Sheets

OPTICAL DISK PICKUP DEVICE INCLUDING WAVEGUIDE WITH SEPARATE INTEGRATED GRATING COUPLERS FOR LASER OUTPUT, FOCUS, AND TRACKING ERROR SIGNALS

BACKGROUND OF THE INVENTION

The present invention relates to optical disk pickup device used for reading and/or recording data in optical disk systems.

FIG. 1 shows a conventional optical disk pickup device, which comprises a semiconductor laser 1 used as a light source, a grating 2 for generating sub beams to detect tracking error, a beam splitter 3 for reflecting the laser beam emitted through the grating 2 to the optical disk D an object lens 4 for focusing the laser beam reflected from the beam-splitter 3 on to the optical disk D, a cylindrical lens 5 for giving an astigmatism to generate focus error signals and for guiding the reflected laser beam from the surface of the optical disk D to photodetectors 6, and a photodetector 7 for converting guided laser beam into electric signal.

In this optical disk pickup device, the laser beam emitted from the semiconductor laser 1 is diffracted through the grating 2 to generate a main beam (0th diffraction) and two sub beams (1st and −1st) reflected by the beam splitter 3, and then focused on the surface of the optical disk D by the object lens 4.

The laser beam reflected and diffracted by the optical disk D returns to beam splitter 3, and further a part of said beam is focused on photodetector 6 by the cylindrical lens 5.

The main beam is used for detecting information signals stored in the optical disk and focus error signals, and two subbeams are used for detecting tracking error signals.

However, above mentioned conventional optical disk pickup device has the following problems.

Firstly, The size of the optical system itself is large. The number of its components is also large.

Secondly, the arrangement of the components occupies large space so that the total volume of the system becomes bigger. As a result of that, access time of the system is getting slower.

SUMMARY OF THE INVENTION

An object of the present invention is to provide an optical disk pickup device which solves these problems.

Another object of the present invention is to provide an optical disk pickup device in which the optical pickup can be miniaturized and made light so as to make the access time faster;

In order to achieve the preferred object, the optical disk pickup device uses an integrated slab substrate which comprises a semiconductor laser, an optical waveguide for propagating the laser beam, emitted from the semiconductor laser an output grating coupler for focusing the propagated beam on to the optical disk, an input grating coupler for coupling the beam reflected and diffracted from the optical disk into the waveguide and for dividing the beam to detect focus and tracking error signals, and photodiodes for detecting the coupled beam,

DETAILED DESCRIPTION OF THE INVENTION

The optical disk pickup device according to the present invention is shown from FIG. 2 to FIG. 6.

Figure 1:
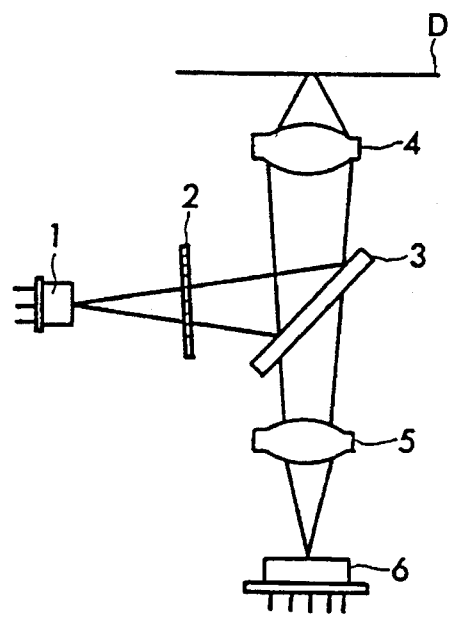
FIG. 1 is a side view showing the fundamental structure of an optical disk pickup device according to the prior art.
Figure 2:
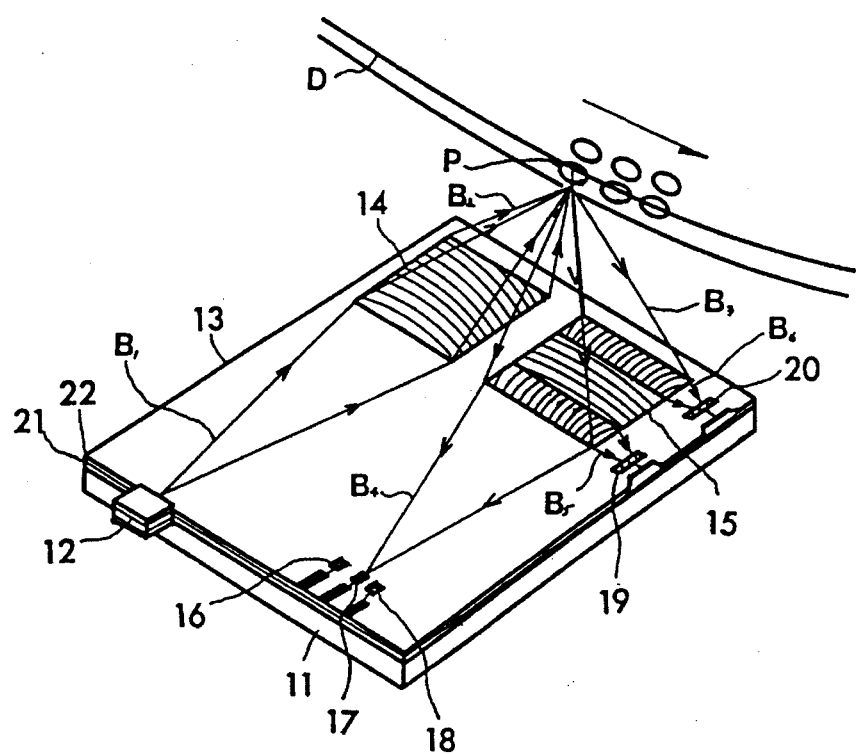
FIG. 2 is a schematic perspective view showing an optical disk pickup device according to the present invention.

As shown in FIG. 2, the optical disk pickup device according to the present invention comprises an integrated device having a slab substrate 11, a semiconductor laser 12, an optical waveguide 13 fabricated on said substrate 11 to propagate the laser beam emitted from said semiconductor laser 12, an output grating coupler 14 fabricated on said substrate 11 to focus the laser beam propagated through said optical waveguide 13 onto the optical disk D, an input grating coupler 15 fabricated on said substrate 11 to couple the reflected and diffracted beam from said optical disk D into said optical waveguide 13 and to divide the beam for detecting focus and tracking error signals, and photodiodes 16, 17, 18, 19, 20 fabricated on said substrate 11 to detect the laser beam which is coupled into said optical waveguide 13 by said input grating coupler 15. Said optical waveguide 13 is a slab optical waveguide which is manufactured by growing glass 22 and the like which have higher refraction index than that of said substrate 11 on a silicon substrate 21.

In order to couple the beam propagated through the optical waveguide 13 outside the optical waveguide 13 and to focus on to one point P of the optical disk D, the grating pattern of the output grating coupler 14 is expressed as the following equation:

$$N\sqrt{(x+c)^2+(y+r_1)^2} - \sqrt{x^2+y^2+f^2} = m\lambda + N\sqrt{c^2+r_1^2} - f \quad \text{①}$$

where $\lambda$ represents wavelength of the laser beam, m represents integer, and N represents refraction index of the optical waveguide 13.

Figure 3:
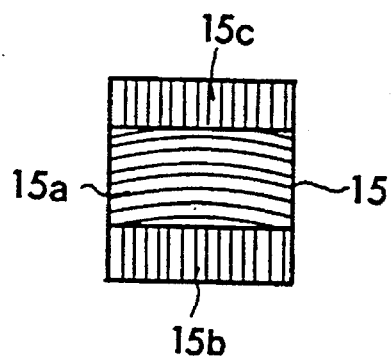
FIG. 3 is a schematic pattern of input grating couplers used in the present invention.

The input grating coupler 15 is divided into three parts which comprise a focus error signal detection part 15a, and two tracking error signal detection parts 15b and 15c disposed at the outside as shown in FIG. 3.

Figure 4:
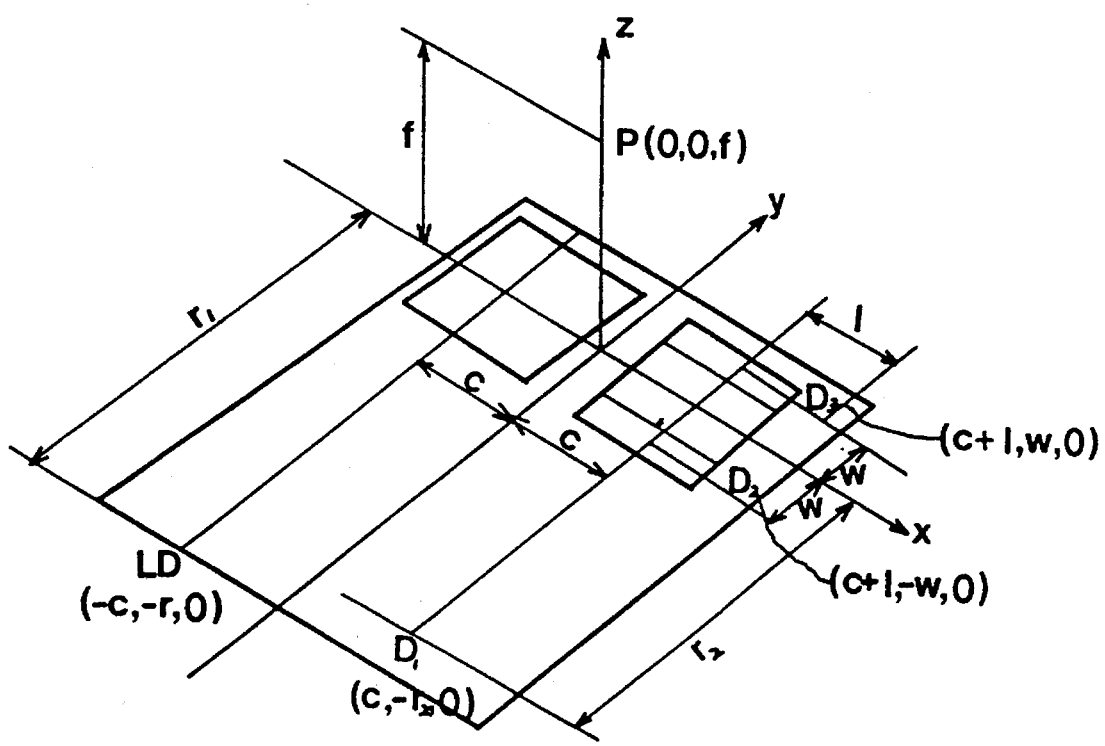
FIG. 4 is a coordinate system of a optical disk pickup device according to the present invention.

In order to couple the expanded beam from one point P of the optical disk D to said optical waveguide 13 and to focus onto D1 point of the coordinate system in FIG. 4, the grating pattern of said focus error signal detection part 15a is expressed as the follwing equation:

$$N\sqrt{(x-c)^2+(y-r_2)^2} - \sqrt{x^2+y^2+f^2} = m\lambda + N\sqrt{c^2+r_2^2} - f \quad \text{②}$$

Further, in order to focus on to $D_2$ and $D_3$ point, respectively, the grating patterns of said tracking error signal detection part 15b and 15c are expressed as the following equations;

$$15b: N\sqrt{(x-c-1)^2+(y+w)^2} - \sqrt{x^2+y^2+f^2} = m\lambda + N\sqrt{(c+1)^2+w^2} - f \quad (3)$$

$$15c: N\sqrt{(x-c-1)^2+(y-w)^2} - \sqrt{x^2+y^2+f^2} = m\lambda + N\sqrt{(c+1)^2+w^2} - f \quad (4)$$

As shown in FIG. 4, in the equations (1), (2), (3), (4), where r1 is the distance between semiconductor laser 12 and output grating coupler 14; r2 represents the distance between input grating coupler 15 and photodiodes 16, 17, 18 for detecting focus error and readout signals; 1 represents the distance between input grating coupler 15 and photodiodes 19, 20 for detecting tracking error signals; f represents the distance between optical disk D and optical disk pickup device; c represents the distance output grating coupler 14 and input grating coupler 15; and w represents the distance between tracking error signal detection part 15b and 15c, respectively.

The output grating coupler 14 and input grating coupler 15 are manufactured by micro patterning technology such as E-beam lithography and the like.

The said photodiodes 16, 17, 18, 19 and 20 comprise a 3-piece-divided photodiode 16, 17 and 18 for detecting readout signals and focus error signals, and a 2-piece-divided photodiode 19 and 20 for detecting tracking error signals;

A laser beam B1 emitted from the semiconductor laser 12 propagates through the optical waveguide B and becomes a beam B2 which is focused by said output grating coupler 14 on to one point P of the optical disk D.

The reflected and diffracted beam B3 from the optical disk D is coupled to said optical waveguide B again by said input grating coupler 15;

Since said input grating coupler 15 comprises a focus error signal detection part 15a and tracking error signal detection parts 15b and 15c disposed at the outside as shown in FIG. 3, the beam B4 output from focus error signal detection part 15a is focused onto D4 point and is detected by the 3-piece-divided photodiodes 16, 17 and 18 disposed at D4, and the beam B5 output from said tracking error signal detection part 15b and the beam B6 output from said tracking error signal detection part 15c are focused onto photodiode 19 disposed at D2 and photodiode 20 disposed at D3, respectively.

In the case of the regular position of the optical disk D, the propagated beam through the focus error signal detection part 15a is focused onto the central photodiode 17 of the 3-piece-divided photodiodes 16, 17 and 18.

Figure 5:
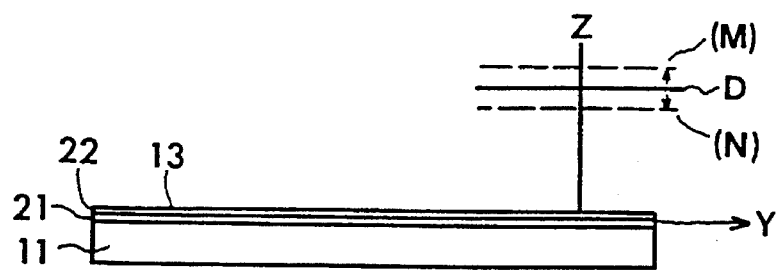
FIG. 5 is a side view of a optical disk pickup device according to the present invention.
Figure 6A:
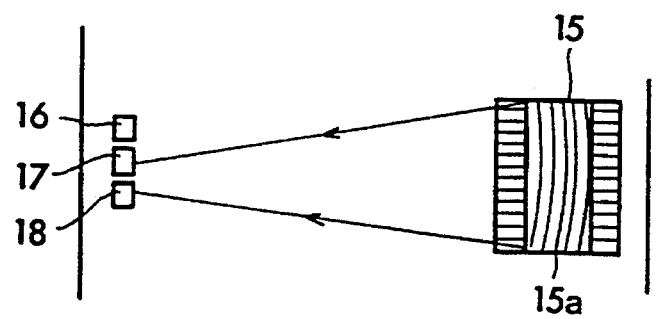
FIGS. 6(a) and 6(b) are a set of plan views illustrating methods of focus error signal detection according to the present invention.
Figure 6B:
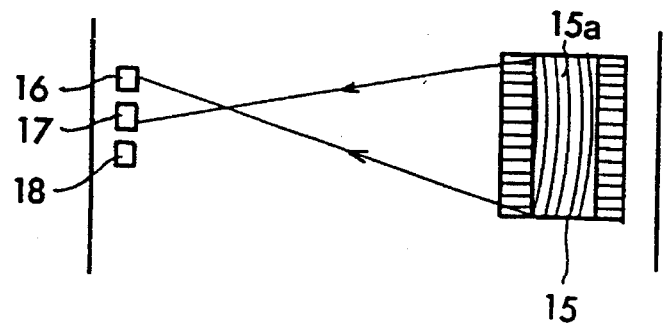

However, if the distance between the optical disk D and said focus error signal detection part 15a lengthens a distance M in FIG. 5 and in FIG. 6(a) or shortens N in FIGS. 5 and 6(b) the focused beam will diffuse asymmetrically as shown in FIGS. 5, 6(a) and 6(b).

When signals of said photodiodes 16, 17 and 18 are represented respectively as Sb, Sa and Sc a focus error signal $E_{FES}$ is obtained by calculating (Sb–Sc), and a readout signal R of the optical disk D is expressed as following equation:

$$R = Sa + Sb + Sc$$

When signals of the photodiodes 19 and 20 are represented respectively as S'b and S'c a tracking error signal $E_{FES}$ is expressed as follows:

$$E_{FES} = S'b - S'c$$

Tracking error signals are detected by the difference of the beam intensity which is focused onto photodiodes 19 and 20 respectively by tracking error signal detection parts 15b and 15c of said input grating coupler 15.

While specific embodiments of the invention have been illustrated and described wherein, it is to realize that modifications and charges will occur to those skilled in the art. It is therefore to be understood that the appended claims are intended to cover all modifications and changes as fall within the true spirit and scope of the invention.

What is claimed is:

1. An optical disk pickup device, comprising:

a semiconductor laser for emitting a laser beam;

an optical waveguide for propagating said laser beam;

an output grating coupler for focusing said propagated beam through said optical waveguide onto one point of an optical disk;

an input grating coupler for coupling a beam reflected and diffracted from said optical disk into said optical waveguide, wherein said input grating coupler includes a focus error signal detection part and two tracking error signal detection parts disposed at the outside thereof;

photodiodes for detecting a focused beam from said input grating coupler;

wherein said photodiodes comprise a 3-piece-divided photodiode for detecting readout signals and focus error signals, and a 2-piece divided photodiode for detecting tracking error signals;

said optical waveguide, said output grating coupler, said input grating coupler, and said photodiodes are integrated on the surface of a slab substrate; and the grating pattern of said output grating coupler is expressed as the following equation $$N\sqrt{(x+c)^2+(y+r_1)^2} - \sqrt{x^2+y^2+f^2} = m\lambda + N\sqrt{c^2+r_1^2} - f$$

where:

N represents the refractive index of the optical waveguide;

x represents the abscissa of a coordinate system;

y represents the ordinate of a coordinate system;

c represents the distance of an output grating coupler and an input grating coupler from the y axis;

$r_1$ is the distance between semiconductor laser and the output grating coupler;

f represents the distance between an optical disk D and the optical pickup device;

m represents an integer; and, $\lambda$ represents the wavelength of the laser beam.

2. An optical disk pickup device comprising:

a semiconductor laser for emitting a laser beam;

an optical waveguide for propagating said laser beam; an output grating coupler for focusing said propagated beam through said optical waveguide onto one point of an optical disk;

an input grating coupler for coupling a beam reflected and diffracted from said optical disk into said optical waveguide, wherein said input grating coupler includes a focus error signal detection part and two tracking error signal detection parts disposed at the outside thereof;

photodiodes for detecting a focused beam from said input grating coupler;

wherein said photodiodes comprise a 3-piece-divided photodiode for detecting readout signals and focus error signals, and a 2-piece-divided photodiode for detecting tracking error signals;

wherein said optical waveguide, said output grating coupler, said input grating coupler, and said photodiodes are integrated on the surface of a slab substrate; and, wherein the grating pattern of said focus error signal detection part is expressed as the following equation $$N\sqrt{(x+c)^2+(y+r_1)^2} - \sqrt{x^2+y^2+f^2} = m\lambda + N\sqrt{c^2+r_1^2} - f$$

where:

N represents the refractive index of the optical waveguide;

x represents the abscissa of a coordinate system;

y represents the ordinate of a coordinate system;

c represents the distance of the output grating coupler and the input grating coupler from the y axis;

$r_2$ is the distance between the input grating coupler and said photodiodes;

f represents the distance between an optical disk D and the optical pickup device;

m represents an integer; and, $\lambda$ represents the wavelength of the laser beam.

3. An optical disk pickup device comprising:

a semiconductor laser for emitting a laser beam;

an optical waveguide for propagating said laser beam;

an output grating coupler for focusing said propagated beam through said optical waveguide onto one point of an optical disk;

an input grating coupler for coupling a beam reflected and diffracted from said optical disk into said optical waveguide, wherein said input grating coupler includes a focus error signal detection part and two tracking error signal detection parts disposed at the outside thereof;

photodiodes for detecting a focused beam from said input grating coupler;

wherein said photodiodes comprise a 3-piece-divided photodiode for detecting readout signals and focus error signals, and a 2-piece-divided photodiode for detecting tracking error signals;

wherein said optical waveguide, said output grating coupler, said input grating coupler, and said photodiodes are integrated on the surface of a slab substrate;

wherein the grating pattern of one of said two tracking error signal detection parts satisfies the following equation $$N\sqrt{(x-c-1)^2+(y+w)^2} - \sqrt{x^2+y^2+f^2} = m\lambda + N\sqrt{(c+1)^2+w^2} - f$$

and the grating pattern of the other of said two tracking detection parts satisfies the following equation $$N\sqrt{(x-c-1)^2+(y-w)^2} - \sqrt{x^2+y^2+f^2} = m\lambda + N\sqrt{(c+1)^2+w^2} - f$$

where:

N represents the refractive index of the optical waveguide;

x represents the abscissa of a coordinate system;

y represents the ordinate of a coordinate system;

c represents the distance of the output grating coupler and the input grating coupler from the y axis;

w represents the distance distance between the tracking error signal detection parts from the x axis;

f represents the distance between an optical disk D and the optical pickup device;

m represents an integer; and, $\lambda$ represents the wavelength of the laser beam.

* * * * *